United States Patent [19]

Foord

[11] 4,359,644
[45] Nov. 16, 1982

[54] LOAD SHEDDING CONTROL MEANS

[75] Inventor: Peter M. Foord, Eastwood, Australia

[73] Assignee: The Electricity Trust of South Australia, Eastwood, Australia

[21] Appl. No.: 46,846

[22] Filed: Jun. 8, 1979

[30] Foreign Application Priority Data

Jun. 9, 1978 [AU] Australia .............................. PD 4651

[51] Int. Cl.³ .............................................. H04B 3/54
[52] U.S. Cl. ................................. 307/40; 340/310 R; 307/3
[58] Field of Search ...................... 307/40, 38, 39, 1, 3; 340/310 R, 310 A

[56] References Cited

U.S. PATENT DOCUMENTS 3,488,517  1/1970  Cowan et al. ........................... 307/3
3,626,297  12/1971  Green ......................... 340/310 A X

FOREIGN PATENT DOCUMENTS 2705643  8/1978  Fed. Rep. of Germany ... 340/310 A

OTHER PUBLICATIONS

"Pulse Coded Inverter for Utility Load Management System", Galloway et al., IAS '77 Annual, pp. 149–155.
*Principles of Communication Engineering,* Wazencraft and Jacobs, pp. 516, 517, 1967.
Information Transmission, Modulation and Noise, Schwartz, pp. 197–201, 1970.

*Primary Examiner*—Michael L. Gellner
*Assistant Examiner*—James L. Dwyer
*Attorney, Agent, or Firm*—Norbert P. Holler; Charles A. Blank

[57] ABSTRACT

An electrical information transmitting means for consumer load control comprises a transmitter which transmits a coded signal through the conductors of an alternating current electrical distribution network as a sequence of wave-form distortions to a receiver which decodes the signal. The receiver comprises two correlators connected in quadrature, and the transmitters and each correlator synthesize synchronous signals from the power frequency, all of which is locked thereto. The D.C. voltage outputs of the correlators are squared and summed so that the receiver is independent of phase angle.

5 Claims, 9 Drawing Figures

LOAD SHEDDING CONTROL MEANS

This invention relates to a means of and method for transmitting information, for example for control of consumer loads in an alternating current electrical power distribution network, and is particularly applicable where there is a need to shed a load from the network under peak conditions for example. However, the invention is not limited to such uses and can be used to control relays, for example, for the control of street lighting, shop lighting, traffic lights and other control functions for which ripple control has been, or could have been, used previously.

BACKGROUND OF THE INVENTION

Because of the variable nature of electrical loads, it is desirable to be able to control selectively the loads to which power is supplied. Thus much use is made of time clocks for switching in various loads, for example pumping facilities, hot water storage devices and the like, but time clocks are not in themselves sufficiently versatile to meet extraordinary conditions and are expensive. This problem has been recognised previously, and attempts to improve control over load shedding facilities and other functions have included the provision of the so-called ripple control.

Reference is made to the Proceedings of the Institute of Electrical and Electronic Engineers of America, Vol. 67, No. 2, February, 1979 on page 241, wherein there is an article entitled "Electric Power Load Management: Some Technical, Economic, Regulatory and Social Issues". In the article there is a general review of load shedding techniques utilising ripple control.

In a conventional ripple control system, an audio-frequency signal is produced by a separate generator and then coupled by means of a high voltage capacitor or transformer onto a high voltage bus. The capital plant required is costly, and is physically bulky. Furthermore ripple control is capable of causing inconvenience to consumers under certain conditions because of the relatively large signal magnitude required.

Ripple control receivers as presently used can respond to a relatively wide band width of the ripple frequency, and a range of plus or minus 5% is not uncommon, but such a wide frequency band width of response does not give the security against operation by spurious signals which is sometimes required, and reduces the number of channels which can be used in a relatively small range of signal frequencies. It is found that the frequency at the transmitter of a ripple control unit can vary slightly with both time and temperature and this is also inconvenient and further contributes to a lower standard of security against spurious signals actuating a receive relay than the standard which can be achieved by use of this invention.

An alternative proposal which has been devised by the inventor herein is a voltage distortion caused by switching in a heavy inductive load. This has been proved to be satisfactory but the equipment was found to be expensive and switched such heavy currents that the apparatus operated near its maximum limit.

Further to this, it is known that a system exists whereby the power system voltage wave-form is distorted on the zero crossing, but this again means a very large energy pulse, and each distortion must be separately recognised by the receive circuit.

The main object of this invention is to provide a relatively inexpensive consumer load control means and method. A second object is to provide a means and method which will result in a very high degree of security against actuation of a receive circuit by a spurious signal. A still further object of this invention is to provide a system which is simple to use, wherein the constituent elements of both the transmitter and receiver are of rugged and simple construction and not likely to have maintenance problems, and yet wherein a large number of codes can be transmitted for a comparatively low cost to thereby control a large number of functions.

BRIEF SUMMARY OF THE INVENTION

Briefly in this invention, an electrical information transmitting means for consumer load control comprises a transmitter which transmits a coded signal through the conductors of an alternating current electrical distribution network as a sequence of waveform distortions to a receiver which decodes the signal. The receiver comprises two correlators connected in quadrature, and the transmitters and each correlator synthesise synchronous signals from the power frequency, all of which are locked thereto. The D.C. voltage outputs of the correlators are squared and summed so that the receiver is independent of phase angle.

More specifically, the invention consists of means for transmitting information for example for control of a load in an alternating current electric power distribution system having a power frequency which comprises a transmitter coupled to the system to derive power from the system and generate a signal the frequency of which is synthesised from and locked to the power frequency, and to superimpose said signal upon the power frequency wave-form as a sequence of waveform distortions, a receiver also coupled to the system, said receiver having a detector circuit comprising a pair of correlators driven ninety degrees out of phase with each other by a control frequency which is synthesised from and locked to the power frequency and synchronous with said signal frequency, such that a signal input to the correlators appears as a D.C. voltage output thereof, a squaring circuit coupled to the signal output of each correlator and a summing circuit coupled to the squaring circuits, so arranged as to square and sum the D.C. voltage outputs of said correlators.

The absence of phase sensitivity in the receiver causes the receiver to function as a very narrow band width filter (in some cases, about one twentieth of the effective receiver bandwidth of a ripple control receiver). This in turn enables relatively low amplitude signals to be used, and results in equipment very much less expensive than ripple control equipment. Since the receiver band width is small, in some instances the signal can comprise several frequencies which are so close together that a number of circuit components can be common to all signal frequencies, but the several frequencies may be employed in a frequency shift binary code.

Locking of both the signal frequency and the receiver correlator control frequency to the power frequency enables the receiver to always track the transmitted signal frequency.

In another aspect, the invention relates to a method of transmitting electrical information, for example for controlling an electrical load in an alternating current electrical power distribution system, having a power frequency, comprising, coupling a transmitter to the system to derive power from the system and generating in the transmitter a signal the frequency of which is synthesised from and locked to the power frequency, and superimposing said signal upon the power frequency waveform as a sequence of waveform distortions, coupling a receiver to the system to derive power from the system, and driving two correlators in the receiver ninety degrees out of phase with each other with a control frequency synthesised from and locked to the power frequency and synchronous with said signal frequency, so as to convert a signal input to each said correlator into a D.C. output thereof, and squaring and summing said D.C. outputs.

The invention has a number of advantages over known ripple control and wave distortion techniques.

Firstly the method of producing the signal by waveform distortion is simple and low in cost and lends itself to be driven at a precise frequency or a range of frequencies.

Secondly by using a frequency synthesised from the supply frequency it is a simple matter to make the transmitted frequency identical with the filter characteristics in the receiver by using a synchronous correlator as a detector. This produces a very selective and stable detector without using any critically tuned components.

Thirdly, as a result of the close match between transmitted frequency and receiver characteristics a very low level of signal magnitude is required for reliable and secure transmission. The level of signal is lower than with any system which has been devised heretofore and which is known to the Applicant.

BRIEF SUMMARY OF THE DRAWINGS

Embodiments of the invention are described hereunder in some detail with reference to and are illustrated in the accompanying drawings in which.

DETAILED DESCRIPTION OF THE PREFERRED EMBODIMENTS

In all the embodiments described hereunder, the sequential distortion of the power system voltage is used for controlling consumer loads in an alternating current electrical power distribution network. The distortions are transmitted via high voltage feeders and distribution transformers and appear between the active and neutral lines of each phase at consumer premises.

The signalling device distorts the normal system voltage in a repetitive manner at a frequency which is derived from and hence locked to the power supply frequency and which is a fractional multiple of the power frequency. Desirably the frequency lies in the range of between 200 and 400 Hz and an example of one frequency is 237.037 Hz derived from the expression $(128/27) \times 50$. A multiple bit code is used to obtain a number of separately identifiable channels, and a plurality of transmission frequencies (in these embodiments, three) are used to enable frequency shift keying.

In the embodiments described hereunder, an 11 bit code is used to obtain 256 separate channels (that is 128 ON-OFF channels). Each bit is formed by transmitting at a selected frequency for 0.8 seconds and this results in a total transmission time of 8.8 seconds. By using the first two bits of the code only for channel 0, a fast signalling channel is formed. The normal time to send a command on this channel is one second and is provided for the purpose of emergency load shedding.

Figure 1:
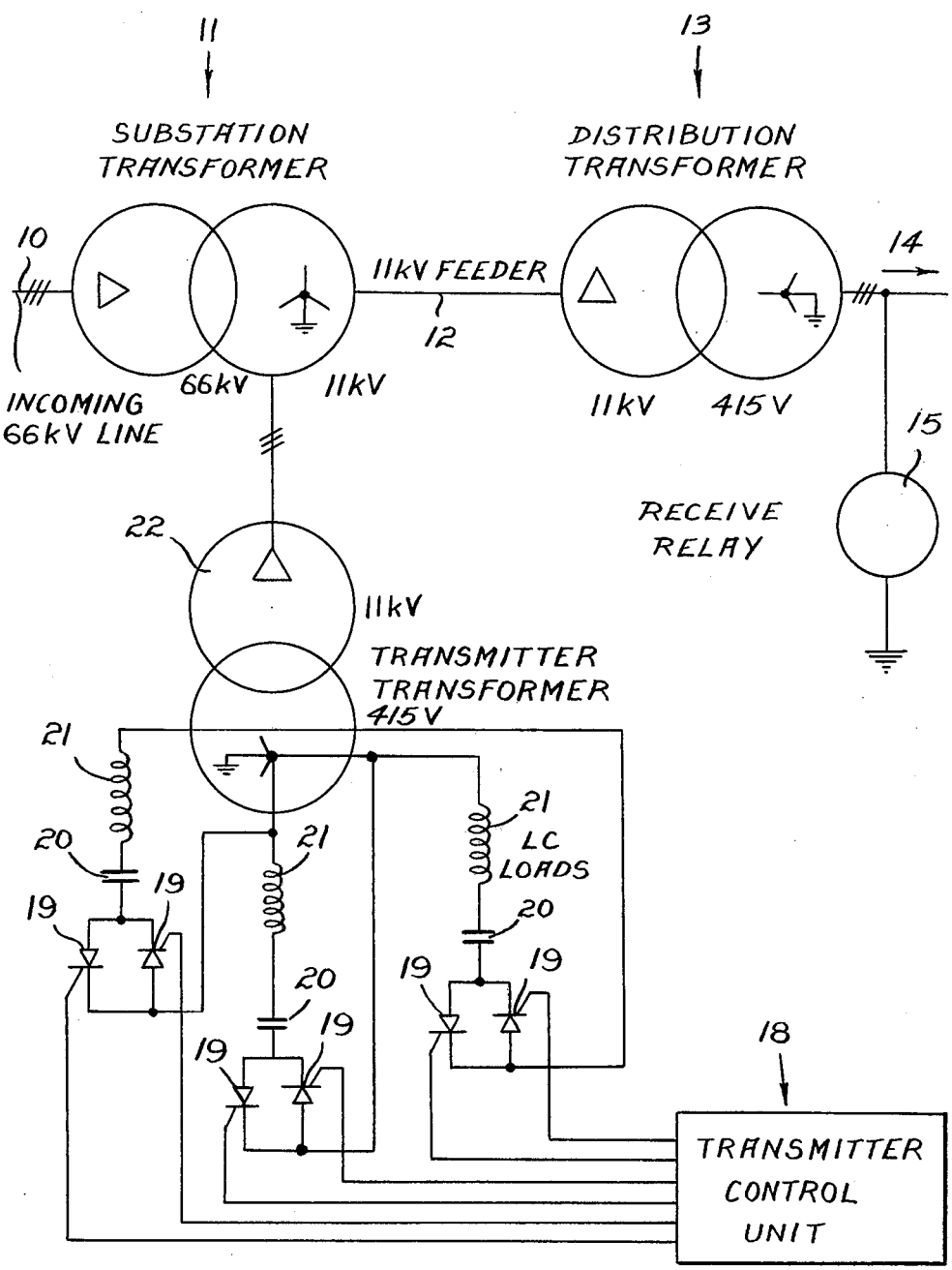
FIG. 1 is a diagrammatic representation of the system arrangement.
Figure 3:
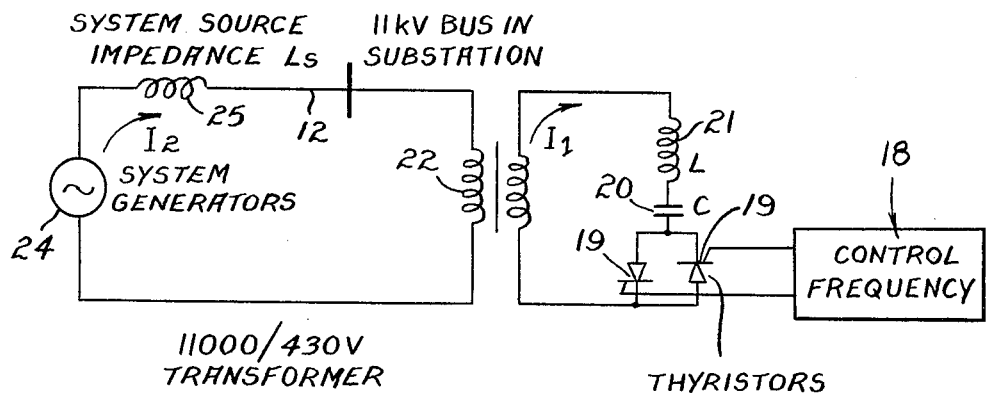
FIG. 3 is a diagrammatic representation of a basic transmitter.
Figure 4:
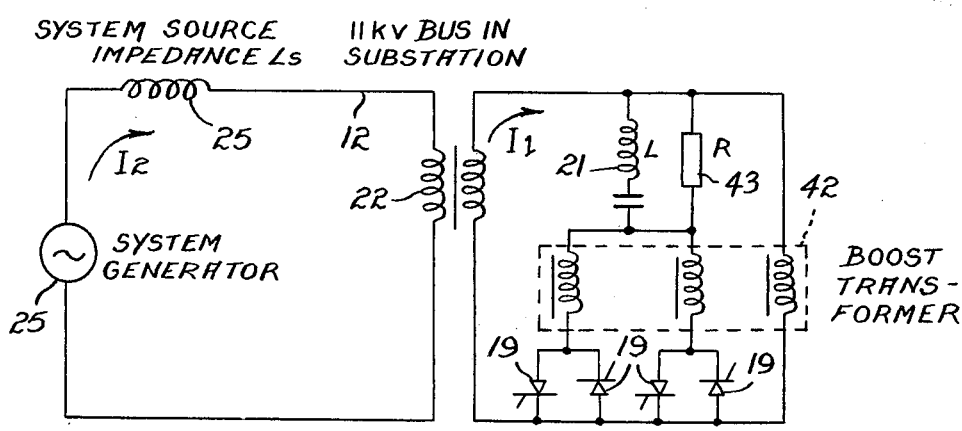
FIG. 4 is a diagrammatic representation of a boosted transmitter.

FIG. 1 illustrates in diagrammatic form the entire system arrangement, wherein an incoming high tension three phase line 10 (66 kV) feeds a substation transformer 11 which reduces the voltage for distribution purposes (for example 11 kV) and the feeder line 12 (three phase) feeds into a distribution transformer 13, the output of which feeds to a consumer network designated by the arrow 14, and this includes a plurality of receivers 15. A transmitter control unit is designated 18 (described in greater detail with reference to FIG. 2) and this feeds silicon controlled rectifiers (thyristors) 19. As shown in FIGS. 3 and 4, each pair of thyristors 19 energise a capacitor 20 and inductance 21 therebeing one LC load on each of the phases. This is transformed by a transmitter transformer 22 to the 11 kV feeder line 12, thereby providing an exceedingly simple coupling means to the 11 kV bus of the transformer 11. In FIGS. 3 and 4, the alternators designated 24 represent the power station alternators, and the inductance designated 25 designates the system source impedance of the lines (Ls).

Figure 2:
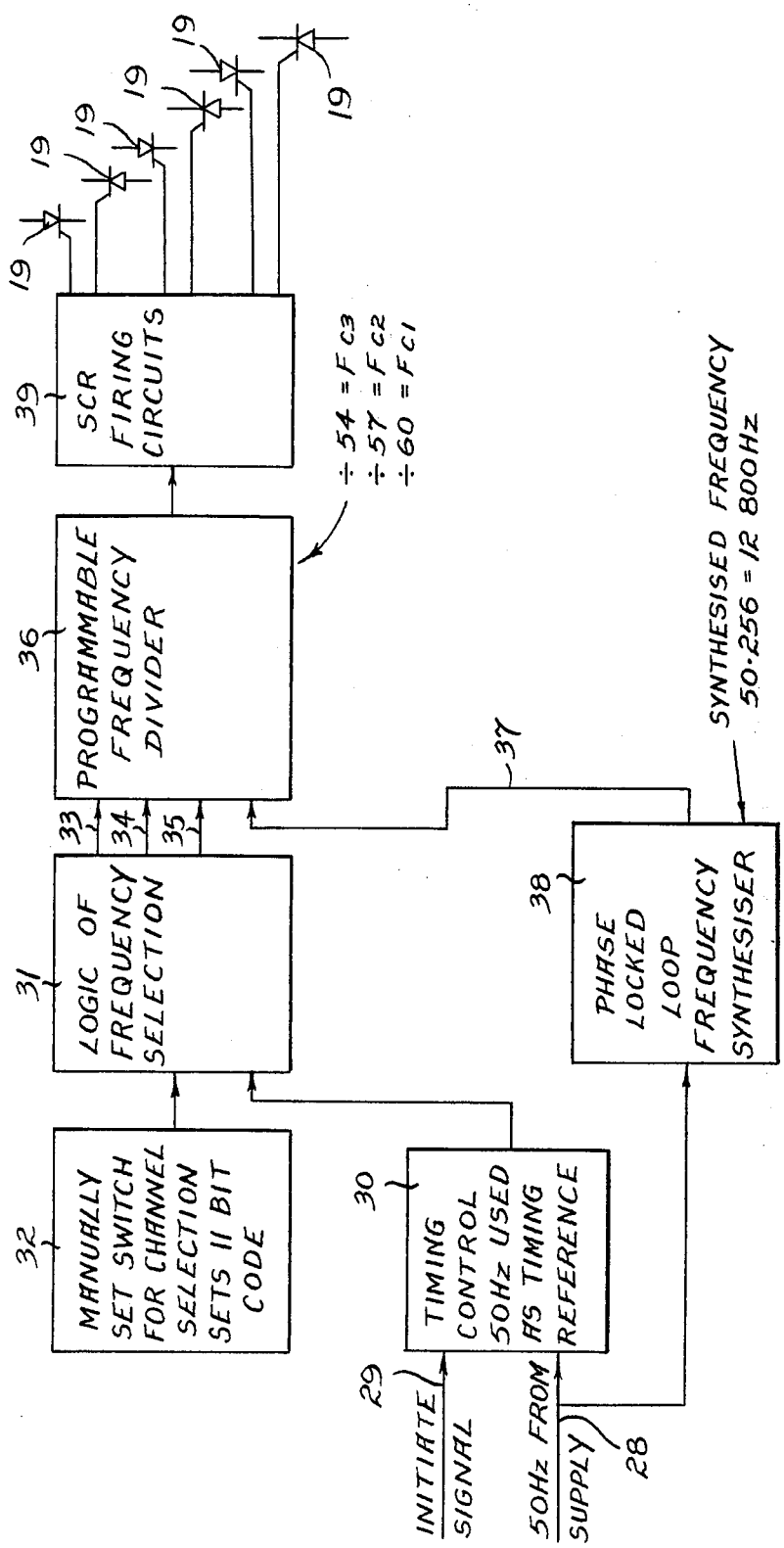
FIG. 2 is a block diagram of a transmitter control unit.

The block diagram of FIG. 2 represents the transmitter control unit, wherein the power system reference frequency enters the system on line 28, and the switch or other means used to initiate the signal enters on the control line 29. A timing control device 30 is thereby placed into operation upon a command from the control line 29. The device utilises the frequency of the supply as a base for all timing functions and controls the logic of frequency selection device 31, this being set up by a manually set switch 32 for channel selection by an 11 bit code.

The output from the logic of frequency selection, lines 33, 34 and 35 control the programmable divider 36 and thus determine which one of three frequencies is to be transmitted. The programmable frequency divider is fed with a synthesised frequency, (in this embodiment 256 times the frequency of the supply, that is for a 50 Hz power supply, 12800 Hz), through a coupling line 37 from a phase locked loop frequency synthesiser 38, which receives its reference frequency from the power supply line 28. The programmable frequency divider divides the 12800 Hz either by 54, 57 or 60 to give the frequencies 237.04 224.56 and 213.33 Hz herein designated FC3, FC2 and FC1 in this embodiment. The selected frequency is fed to the thyristors 19 of the three phases of power through their respective firing circuits generally designated 39.

Figure 5:
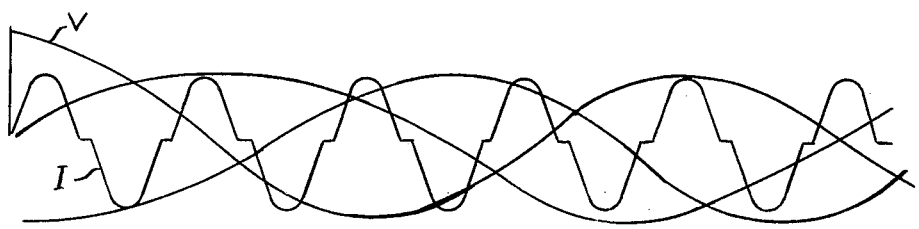
FIG. 5 is a diagram which shows the relationship between the system voltage and the transmitter load current on a test which was conducted by the Applicant herein.

FIG. 5 illustrates the system voltage to load current relationship which is achieved by the thyristor arrangement.

The transmitter basic arrangement is shown in FIG. 3.

The transformer load consists of the air cored inductance 21 in series with the capacitor 20, and switched by the back to back thyristors 19 as described above. However, the load current does not flow continuously and as illustrated in FIG. 5 has an off period between each pulse. This off period is achieved by making the resonant frequency of the LC combination 21/20 higher than 1.15 times the control frequency FC3, FC2 or FC1 firing the thyristors. The actual resonant frequency is not critical and hence it is not necessary to use expensive critically tuned components. The off period is essential for the successful operation of the circuit and assists in maintaining simplicity of design. The gap inbetween the pulses causes the LC circuit 21/20 to receive energy from the power system and hence oscillation is maintained. The start of each current pulse is controlled by the firing of one or other of the thyristors by the control frequency (which is the signal frequency). The thyristors are commutated off as the load current pulse goes to zero.

The control frequency for firing the thyristors is always derived from the power frequency (in this embodiment 50 Hz), and for this reason it is always locked to it. Suitable frequencies can be obtained by first multiplying the power frequency (50 Hz) by an integer in a phase locked loop circuit and then dividing by different integers. In this embodiment, three separate frequencies are used to form a frequency shift system of coding. The supply frequency is first multiplied by 256 and then divided by 54, 57 or 60 to produce the frequencies of 237.04, 224.56 and 213.33 Hz respectively. It is advantageous to use frequencies between 200 and 300 Hz because less signal is then lost due to capacitor loads on the power system. By using three frequencies close together, the same LC components can be used and only the control frequency alters.

As the source impedance of the power system (that is from the alternators to the 11 kV bus) is almost entirely inductive, the current designated I2 in FIGS. 3 and 4, reflected from the oscillating load, will produce a voltage distortion on the 11 kV bus and hence feeder line 12 (FIG. 1) which is proportional to the rate of change of current $$\left(\text{i.e. } V_D = L_s \frac{dI2}{dt}\right).$$

Hence a voltage of the same frequency as the current will be produced on the 11 kV feeder line 12.

The level of oscillation obtained in the basic circuit shown in FIG. 3 is difficult to predict in practice as it is influenced by the amount of resistance in the circuit (within the inductance and transformer windings). It is advantageous to boost this oscillation to control its magnitude, to allow more resistance in the circuit (that is less copper in the windings) and to make more effective use of the capacitors, being the most costly transmitter components. Extra energy can be injected into the oscillator circuit by means of the small low voltage boost transformer 42 shown in FIG. 4. The four thyristors 19 need to be selectively fired to ensure that the boost transformer voltage always assists the oscillation. Control of oscillation magnitude is then obtained by an adjustable damping resistor 43 across the resonant circuit.

The magnitude of signal voltage required for reliable and secure operation has been found to be about 0.4% of the system voltage with the receivers set at a threshold level of 0.1%.

Figure 6:
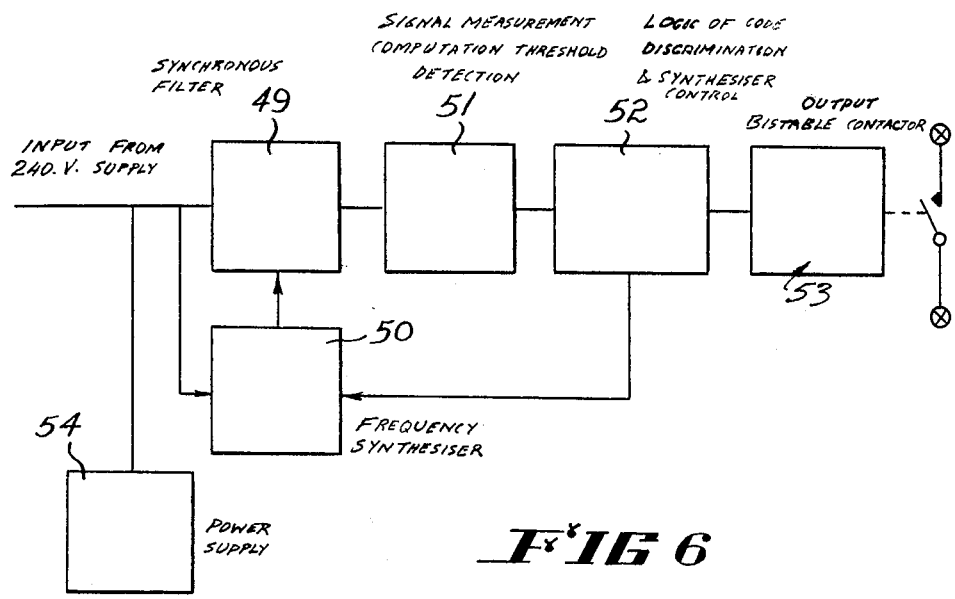
FIG. 6 is a block diagram showing the receiver components according to the first embodiment.
Figure 7:
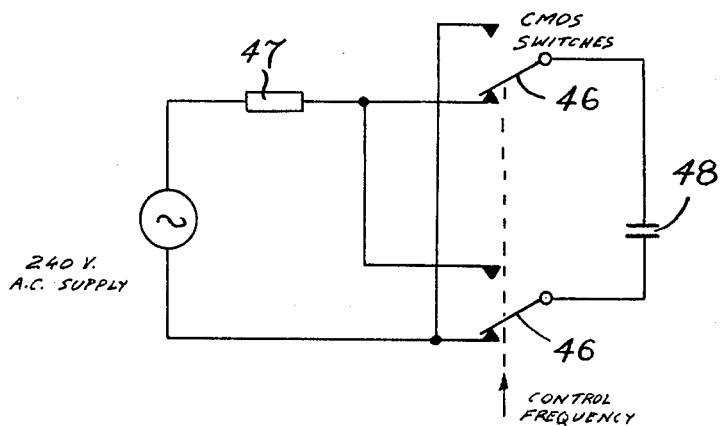
FIG. 7 is a diagrammatic representation of the basic synchronous correlator utilised in the receiver.
Figure 9:
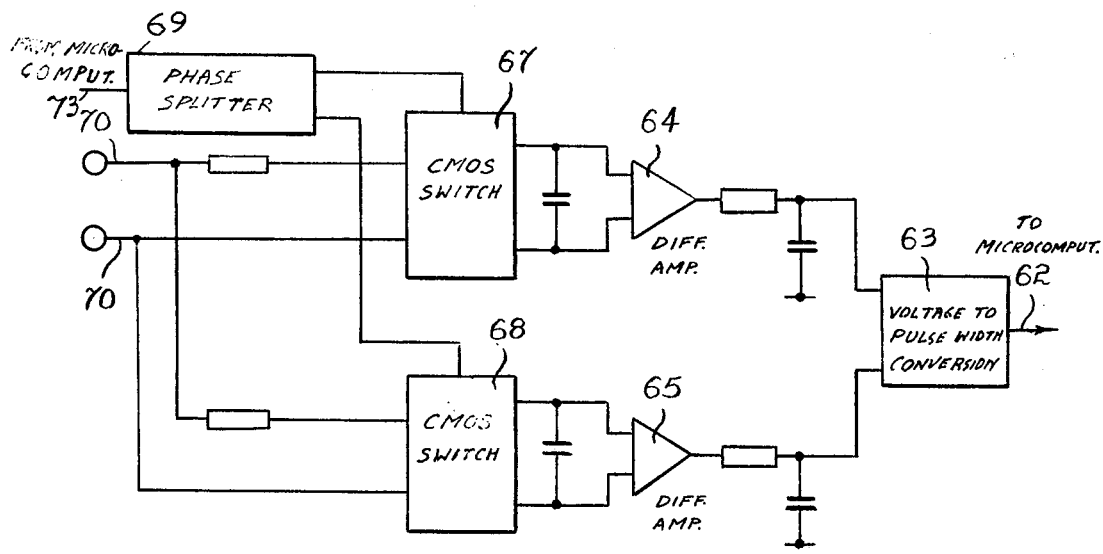
FIG. 9 is a diagrammatic representation of the functions included in the correlator integrated circuit 60 shown in FIG. 8.

The following description refers to the receiver which is used for signal detection and decoding, and illustrated primarily in FIGS. 6 and 7. The basic correlation circuit used for detection is shown in FIG. 7 and consists of a pair of solid state (CMOS) changeover switches 46 driven at the signal frequency, between an RC combination of resistor 47 and capacitor 48. This may be regarded as a synchronous filter or correlator, and a pair of these driven in quadrature is generally designated in FIG. 6 by the designation 49. (FIG. 9 shows the details of circuit).

The frequency driving the switches must be synthesised in the receiver in the same manner as was done in the transmitter. This frequency is therefore also locked to the power frequency (50 Hz). By means of the CMOS switches 46, the signal voltage is synchronously rectified and appears as a DC voltage on the capacitor 48. The actual value of DC voltage will vary depending on the phase relationship between the correlator control frequency and the incoming signal. If they are in phase maximum signal will be received and if they are 90° out of phase zero signal will be received.

If the signal to be detected $= A \sin(\omega t + \theta)$, where A is a constant representing the peak amplitude of waveform, $\omega$ is the angular frequency and $\theta$ is the phase angle between the signal and the correlator control frequency, then for maximum correlation (zero phase shift) the signal will be full wave rectified and smoothed to produce an average DC voltage $V_{C1} = A/1.57$. When phase shift is present the relationship will result in $$V_{C1} = (A/1.57) \cos \theta.$$

By using a second correlator in quadrature with the first, $$V_{C2} = (A/1.57) \sin \theta.$$

Squaring and summing each result, $$V_{C1}^2 + V_{C2}^2 = A^2/2.46.$$

This gives a result which is independent of phase angle. Hence the signal detection section of the receiver consists of two synchronous filters 49, driven 90° apart by a synthesised frequency identical with the transmitted signal frequency. The output from the two correlators will normally be zero until the incoming signal is detected. When a signal arrives from the transmitter, D.C. voltages will appear on the correlation capacitors, because the correlators synchronously rectify the incoming signal. The D.C. voltage on each correlation capacitor is then measured, squared and summed. This non phase-sensitive correlation method of detection has several advantages for use in the receivers:

(1) it is made simply and is low in cost,
(2) it is very selective in frequency discrimination having a 3 dB band width of approximately 1 Hz, and hence gives high rejection to all other frequencies including any random noise on the power line due to fluctuating loads.

(3 dB band width is the band width at half maximum signal power level.)

(3) It does not require any critically tuned components and hence stability over a long period of time is achieved.

(4) Because of its very narrow band width response, a very low level of signal can be used without sacrificing reliability or security.

Reference is now made to the coding system.

A frequency shift keying system of coding is used to ensure security of transmission. An 11 bit code is used and a "1" or a "0" of the code is represented by one of three closely spaced transmission frequencies. If the three transmission frequencies are $F_{C1}$, $F_{C2}$ and $F_{C3}$, where $F_{C1}$ is the lowest frequency and $F_{C3}$ is the highest frequency, then the following general rule is used. The first bit of the code is always set at frequency $F_{C3}$ and is termed the start bit. Its detection by the receiver initiates the receiver to search for the remainder of the code. From then on a "1" in the code is represented by the higher of the two remaining frequencies and a "0" by the lower of the two remaining frequencies. By this means each successive bit of the code is always a different frequency. This enables improved bit separation and identification.

The second bit of the code is reserved to provide a FAST OFF function for emergency load shedding. If the second bit is sent as a "1" the FAST OFF function is immediately recognised and the receivers will respond to this if they are programmed to do so. For all other codes the second bit is a "0" and the receiver then continues to look for the remainder of the code.

For these codes bit 3 is always sent as a "0" and is termed a "continue" bit. It allows the receiver to set itself up correctly to search for the remainder of the code. The receiver must set its correlator control frequency correctly for each bit of the code according to the channel number code programmed into it. If a match is obtained between the signal transmitted and the code programmed into the receiver the receiver operates a bi-stable output contactor controlling external load. A total of 128 ON-OFF channels are available and all of these can be made responsive to the FAST OFF code if desired.

As shown in FIG. 6, the receiver may be divided into 6 separate functional blocks as follows:

Frequency synthesiser 50, synchronous filter 49, signal measurement, computation (i.e. summing and squaring) and threshold detection 51 containing a summing and squaring circuit, logic of code discrimination (decoder) and synthesiser control unit 52 output bi-stable contactor 53 and power supply 54.

The details of the synchronous filter section 49 which extracts the signal from the power supply network have already been described above.

The frequency synthesiser section comprises a standard phase locked loop multiplier followed by a programmable divider to select the required three frequencies, this being in accordance with known art.

Figure 8:
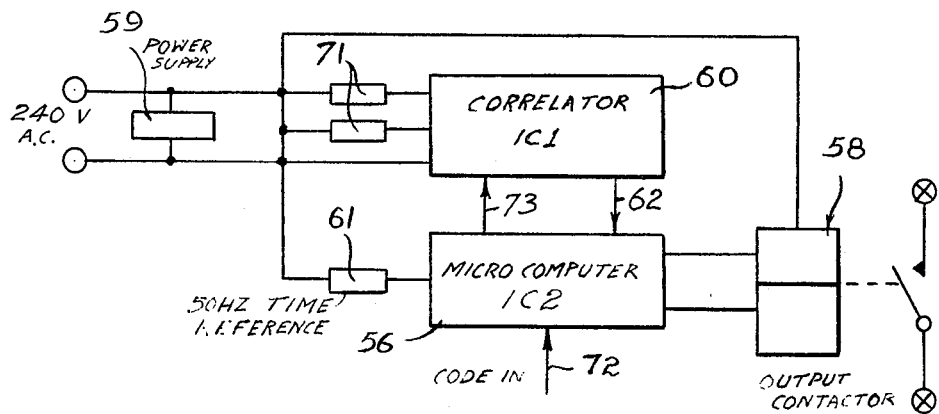
FIG. 8 is a block diagram of a receiver according to the second embodiment and using two integrated circuits one of which is a microcomputer.

Signal measurement and computation section can be implemented in analogue form with analogue multipliers, summation amplifier and comparator for threshold detection. Alternatively the signal can be converted to digital form and all computation and threshold detection performed digitally. This arrangement is a second embodiment which is a preferred embodiment and is illustrated in FIG. 8. It utilises a simple single chip microcomputer 56 to carry out the signal measurement, computation and threshold detection, corresponding to the portion 51 referred to in FIG. 6. It also performs the logic functions of the decoder portion 52 of FIG. 6 as well as the frequency synthesis function of the synthesiser 50. By this means the hardware implementation of the receiver becomes very simple. It consists of one custom integrated circuit to perform the synchronous filter and analogue to digital conversion processes and one microcomputer integrated circuit to perform the signal computation, code discrimination logic and frequency synthesiser functions. The output bi-stable contactor 58 requires electronic drive circuitry so that it can be actuated directly from the microcomputer. Both integrated circuits are fabricated in CMOS technology to keep power supply requirements to a minimum. This enables a very simple power supply to be used consisting of a capacitive divider, rectifier and regulator direct from the power supply. Hence the receiver is fabricated in a very simple low cost manner (when mass produced) without requiring any critical, low tolerance or thermally stable components.

In FIG. 8, the power supply is designated 59, the correlator custom integrated circuit 60 and the power supply frequency reference is supplied to the microcomputer through resistor 61. Designations 71 are the input resistors to the synchronous filter in the correlator. The correlated signal in the form of a pulse of variable width is transmitted to the microcomputer through line 62. 72 designates a code which is programmed into the micro-computer with manual switches. FIG. 9 is a diagrammatic representation of the functions performed by the correlator custom integrated circuit 60 shown in FIG. 8. Voltage to pulse width conversion circuit 63 is fed from the filtered outputs of the two differential amplifiers 64 and 65 in turn fed from the CMOS switch assemblies 67 and 68 respectively as shown in FIG. 7, the CMOS switch assemblies being controlled through the phase splitter 69 by the frequency synthesised in the microcomputer through line 73. A voltage signal is supplied through the 240 V. A.C. power leads 70.

From the above description it will be seen that the invention differs from conventional ripple control in two fundamental respects:

(1) the signal is produced as a wave-form distortion by applying an inductive-capacitive load to the system, and (2) by using a signal which is locked to the power system frequency a non-phase sensitive correlator is used in the receivers for detection. The fact that the transmitted signal and the receiver correlator are both locked to the supply frequency produces a very selective method of detection and results in a signal magnitude required for reliable operation being considerably lower than for conventional ripple control.

The low level of signal required combined with the simple method of signal generation and the fact that the receivers can be built using only two integrated circuits results in the overall cost of the equipment being lower by a significant amount.

As said above, the device can be used for remote control of any loads, for example shedding peak loads, switching storage water heaters controlling the switching of lights, pumps or the like, the control of traffic lights and other functions. The number of functions can be increased to any desired number by increasing the number of bits transmitted in the code or the number of frequencies.

The embodiments described relate to transmitting a signal from a sub-station to a consumer. A similar means and method can be used for signalling from a consumer back to the sub-station. However, the correlators are then arranged to monitor a current signal instead of a voltage signal.

I claim:

1. Electrical load control means for transmitting information for example for control of a load in an alternating current electrical power distribution system having a power frequency, comprising:

a transmitter comprising an inductive-capacitive load directly coupled to the system which derives power solely from the system and generates a signal the frequency of which is synthesised from and locked to the power frequency, and which superimposes said signal upon the power frequency waveform as a sequence of waveform distortions, said transmitter also comprising a frequency synthesiser which multiples said power frequency by a first integer and three frequency dividers which divide said multiplied frequency by respective further integers each of which is smaller than said first integer and which provide three separate signal frequencies which form a frequency shift code system, a receiver also coupled to the system, said receiver having a detector circuit comprising a pair of correlators driven 90 degrees out of phase with each other by a control frequency which is synthesised from and locked to the power frequency and synchronous with said signal frequency, such that a signal input to the correlators appears as a DC voltage output thereof, a squaring circuit coupled to the signal output of each correlator and a summing circuit coupled to the squaring circuits, so arranged as to square and sum the DC voltage outputs of said correlators and thereby provide a voltage resultant independent of phase angle.

2. Electrical load control means for transmitting information according to claim 1 wherein said transmitter comprises an encoder which encodes the signal as a binary code.

3. Electrical load control means for transmitting information for example for control of a load in an alternating current electric power distribution system having a power frequency, comprising:

a transmitter comprising an inductive-capacitive load directly coupled to the system which derives power solely from the system and generates a signal the frequency of which is synthesised from and locked to the power frequency, and which superimposes said signal upon the power frequency waveform as a sequence of waveform distortions, said transmitter also comprising a frequency synthesiser which multiplies said power frequency by a first integer, and at least one frequency divider which divides said multiplied frequency by a second integer which is smaller than said first integer, a receiver also coupled to the system, said receiver having a detector circuit comprising a pair of correlators driven ninety degrees out of phase with each other by a control frequency which is synthesised from and locked to the power frequency and synchronous with said signal frequency, such that a signal input to the correlators appears as a D.C. voltage output thereof, a squaring circuit coupled to the signal output of each correlator and a summing circuit coupled to the squaring circuits, so arranged as to square and sum the D.C. voltage outputs of said correlators and thereby provide a voltage resultant independent of phase angle.

4. Electrical load control means for transmitting information according to claim 1 or claim 3 wherein the frequency of said transmitter lies between 200 Hz and 400 Hz.

5. Electrical information transmitting means for transmitting information according to claim 3 wherein each said correlator comprises a pair of CMOS changeover switches each connected between a resistor and a capacitor, said CMOS switches being driven through a phase splitter which effects said ninety degrees phase shift.

* * * * *